United States Patent
Simon Bacardit et al.

(10) Patent No.: US 6,935,705 B2
(45) Date of Patent: Aug. 30, 2005

(54) SERVO BRAKE BOOSTER WITH TWO DIFFERENTIATED FIXED AND VARIABLE JUMPS

(75) Inventors: Juan Simon Bacardit, Barcelone (ES); Bruno Berthomieu, Barcelona (ES); Fernando Sacristan, Barcelone (ES); Antony Auguste, Villiers sur Marne (FR)

(73) Assignee: Robert Bosch GmbH, Stuttgart (DE)

( * ) Notice: Subject to any disclaimer, the term of this patent is extended or adjusted under 35 U.S.C. 154(b) by 2 days.

(21) Appl. No.: 10/478,580

(22) PCT Filed: May 23, 2002

(86) PCT No.: PCT/FR02/01732

§ 371 (c)(1),
(2), (4) Date: Apr. 19, 2004

(87) PCT Pub. No.: WO02/094628

PCT Pub. Date: Nov. 28, 2002

(65) Prior Publication Data

US 2004/0189088 A1 Sep. 30, 2004

(30) Foreign Application Priority Data

May 25, 2001 (FR) .......................................... 01 07018

(51) Int. Cl.⁷ ................................................. F15B 9/10
(52) U.S. Cl. .................................. 303/114.1; 91/369.2

(58) Field of Search ................................. 91/49, 376 R, 91/369.1, 369.2, 369.3; 92/165 PR, 99.48; 60/589; 303/113.4, 114.1, 114.3; 188/355, 356, 357, 358, 359, 360

(56) References Cited

U.S. PATENT DOCUMENTS 5,012,723 A * 5/1991 Gauthier ..................... 91/369.2
6,209,441 B1 * 4/2001 Takaku et al. ............. 91/369.2

FOREIGN PATENT DOCUMENTS

WO   WO 0189901   * 11/2001

* cited by examiner

*Primary Examiner*—Matthew C. Graham
(74) *Attorney, Agent, or Firm*—Leo H McCormick, Jr.; Warren Comstock

(57) ABSTRACT

A pneumatic brake booster (10) having a moving piston (22) for urging an actuating rod (34) of a master cylinder (28) in response to actuation of a plunger (56). The plunger has a front end that passes through the piston (22) that forms a first feeler (62) that penetrates a reaction disc (44) located between the piston (22) and the actuating rod (34) to transmit to the plunger (56) a reaction force of the master cylinder (28) and a second feeler (68) that is pushed by the plunger (56) when the control rod (46) is actuated at a rate higher than a determined rate and immobilized by a one-way engagement device (70) in an axial position that varies with respect to the piston (22) and then is driven by the piston to push the second feeler (68) into the disc (44) so that the first feeler (52) applies a braking force more rapidly.

8 Claims, 6 Drawing Sheets

SERVO BRAKE BOOSTER WITH TWO DIFFERENTIATED FIXED AND VARIABLE JUMPS

BACKGROUND OF THE INVENTION

The invention relates to a pneumatic brake booster for actuating a brake master cylinder of a motor vehicle.

The invention relates more particularly to a pneumatic brake booster for actuating a brake master cylinder of a motor vehicle, of the type comprising a rigid casing in which there can move a transverse partition sealingly delimiting a front chamber subjected to a first, engine depression, pressure and a rear chamber subjected to a second pressure that varies between the engine depression and atmospheric pressure, of the type which comprises a moving piston secured to the moving partition, a front face of which can act on a rod for actuation of the master cylinder, of the type comprising a rod for control of the booster, moving in the piston selectively as a function of an axial input force exerted forwards against a return force exerted on the rod by a return spring (50), of the type comprising a plunger which is arranged in front of the control rod in the piston and which at its rear end comprises at least one annular rear seat for a three-way valve which can move progressively between a position in which, with the control rod at rest, the front chamber and the rear chamber are in communication, and a position in which, with the control rod actuated, the second pressure in the rear chamber increases, the valve placing the rear chamber (18) in communication with atmospheric pressure, and of the type comprising a first feeler forming the front end of the plunger and passing through the piston which, when the control rod is in the rest position, is arranged a first determined jump distance away from a reaction disc inserted between the rod for actuation of the master cylinder and the front face of the moving piston, and which is able, when the control rod is actuated at a rate lower than a determined rate, to be made by the plunger to cover the first jump distance then to penetrate the reaction disc in such a way as to transmit to the plunger and to the control rod the reaction force of the master cylinder.

Numerous examples of conventional boosters of this type are known.

In such a booster, the distance separating the first feeler from the reaction disc is known as the "jump distance" and corresponds to the theoretical distance that the first feeler has to cover before the driver of the vehicle feels the reaction force of the master cylinder.

In practice, when there is clearance between the first feeler and the reaction disc, this distance corresponds to the distance separating the first feeler from the reaction disc, but it may also, when the reaction disc is initially decompressed in contact with the reaction disc, correspond to the travel over which the first feeler is likely to compress the reaction disc until the latter is fully compressed.

In an extreme braking situation for which maximum braking force is exerted on the control rod, actuation of the control rod causes movement of the plunger comprising the first feeler, and this causes the three-way valve to open wide and the rear chamber to be placed at atmospheric pressure. This results in a forwards movement of the moving partition, and the end of the plunger forming the first feeler penetrates the reaction disc made of elastomer which is secured to the rear face of the moving piston, compressing it.

Thus, the force exerted on the rod for actuation of the master cylinder when the control rod is at the end of its travel is the result of the boost force which is brought about by the pressure difference across the moving wall and the force exerted by the plunger forming a feeler on the reaction disc. The driver of the vehicle also feels the braking reaction force, which is transmitted from the master cylinder to the plunger via the reaction disc.

Now, it has been found that a good many drivers, when confronted with an emergency braking situation, underestimate the risks involved and, having braked sharply, release their braking force even though maintaining a braking force is essential in order to avoid an accident.

What happens is that, in the case of an extreme braking situation accompanied by a swift movement of the control rod, the plunger may come into contact with the reaction disc and transmit to the driver a feeling of maximum braking before the pressure difference across the front and rear chambers reaches its maximum, and this may lead the driver to release his force, even though he ought to maintain it in order to benefit from maximum braking force.

In order to remedy this drawback, a booster has been proposed which comprises a first feeler which is slidably mounted with respect to the plunger to penetrate the reaction disc and which can then, when the control rod of the booster is actuated at a determined rate, be locked with respect to the moving piston so as to maintain maximum braking force on the rod for actuation of the master cylinder via the reaction disc even though the driver may have partially released his force.

This design has the disadvantage of entailing a significant force on the part of the driver, because in order for the feeler to penetrate the reaction disc at the end of its travel, the actuating force has to be exerted against the reaction force of the master cylinder.

This is particularly penalizing in the case of emergency braking, that is to say when a braking force is applied swiftly when the duration of actuation needs to be as short as possible.

SUMMARY OF THE INVENTION

The invention overcomes the drawbacks of the two aforementioned designs by proposing a booster according to the first design to which is added a second feeler which, during swift application, can be pushed by the plunger and locked axially with respect to the piston, then be pushed by the piston into the reaction disc so that swift application of a braking force can be achieved, with a new jump distance of variable value greater than the initial value, and encountering only a reduced antagonistic force transmitted by the reaction disc so that application of the braking force can be achieved more swiftly.

To this end, the invention proposes a booster as described previously, characterized in that it comprises a tubular bushing which is slidably mounted on the plunger, which comprises a front portion which passes through the piston and an end of which comprises a second feeler, and which is capable, when the control rod is actuated at a rate higher than a determined rate, of being pushed by the plunger and immobilized with respect to the piston by a one-way engagement device in an axial position that can vary depending on the rate at which the control rod is actuated, then of being driven by the piston to cause the second feeler to penetrate the reaction disc, so as to allow the first feeler to apply a rapid braking force against an antagonistic reaction force of the master cylinder which is reduced along a second, variable, jump distance greater than the first jump distance.

According to other features of the invention:

the bushing comprises a rear tubular portion which is slidably mounted in a complementary rear bore of the piston, the one-way engagement device comprises a key which is mounted in a recess of the piston passing through the piston at right angles to its axis and of which a roughly annular part surrounds the bushing with clearance and is capable, when the input force exerted on the control rod is at a rate higher than the determined rate, of being driven by the moving piston to rock about an axis which, on the whole, is transversal, so as to collaborate with the periphery of the rear tubular portion of the bushing to immobilize the said bushing in the variable axial position, the rear tubular portion of the bushing has a constant diameter so that the roughly annular part of the key immobilizes the bushing by wedging, the key comprises a roughly L-shaped lower part which extends radially from its annular part and which is returned elastically against an abutment face of the casing of the piston by a return spring inserted between a front face of the recess of the piston and a front face of an upper part of the key, the second feeler comprises an annular front face which is coaxial with the bushing and which has an outside diameter greater than that of the rear portion of the bushing, the reaction disc is housed in a cup coaxial with the piston, which is secured to the rear end of the actuating rod and a rear tubular part of which is slidably mounted in a coaxial annular groove of the front face of the piston, the second feeler is formed as one with the front end of the bushing, the second feeler is produced in the form of an annulus which is slidably mounted on the cylindrical front end of the bushing and which can be pushed into the reaction disc by a shoulder front face of the bushing.

BRIEF DESCRIPTION OF THE DRAWINGS

Other features and advantages of the invention will become apparent from reading the detailed description which follows, for understanding of which reference will be made to the appended drawings in which.

DETAILED DESCRIPTION OF THE INVENTION

Figure 1:
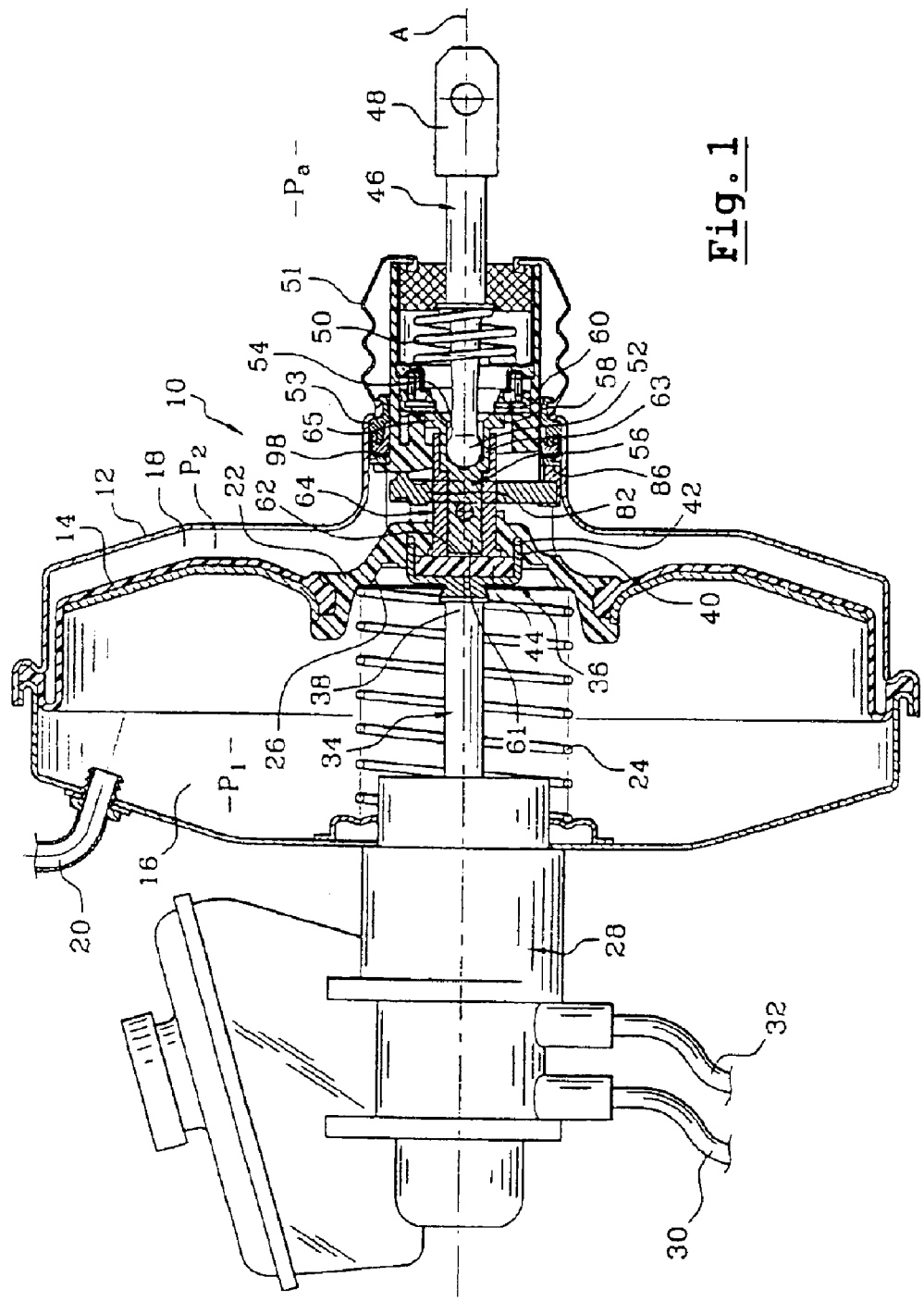
FIG. 1 is an overall view in axial section of a pneumatic brake booster produced according to the invention.

In the description which will follow, identical reference numerals denote parts which are identical or have similar functions.

By convention, the terms "front", "rear", "upper" and "lower" refer respectively to elements or positions directed respectively to the left, to the right, to the top or to the bottom of the figures.

FIG. 1 depicts the entirety of a pneumatic brake booster 10 for a motor vehicle.

In the known way, the pneumatic booster 10 comprises a rigid casing 12 inside which is movably mounted a transverse partition 14 which sealingly delimits a front chamber 16, subjected to a first pressure "$P_1$" the value of which is equal to the vehicle engine depression, and a rear chamber 18 subjected to a second pressure "$P_2$". The second pressure "$P_2$" is able, as will be described later, to vary between the value of the engine depression "$P_1$" and the value of atmospheric pressure "$P_a$".

The front chamber 16 is supplied with pressure "$P_1$" by a depression pipe 20 which is connected, for example, to an inlet manifold (not depicted) of an engine of the vehicle.

The pneumatic booster 10 comprises a moving piston 22 which is secured to the moving partition 14. Inside the casing 12, the moving partition 14 is returned elastically backwards by a return spring 24 which bears against the casing 12 and against a front face 26 of the moving piston 22.

The booster 10 is coupled to a brake master cylinder 28 which is also connected to a braking circuit of the vehicle via hydraulic pipes 30 and 32.

In particular, the front face 26 of the moving piston 22 is coupled to an actuating rod 34 of the master cylinder 28 via a cup 36 coaxial with the piston 22 which is secured to the rear end 38 of the actuating rod 34 and a rear tubular part 40 of which is slidably mounted in a coaxial annular groove 42 made in the front face 26 of the piston 22. The cup 36 houses a reaction disc 44 made of elastomeric material, the function of which will be described later on.

The piston 22 comprises a control rod 46 which is, for example, connected to a brake pedal (not depicted) of the vehicle via a coupling sleeve 48 which is arranged at its rear free end. The rod 46 is able to move in the moving piston 22 selectively as a function of an axial input force exerted forwards on the control rod 46. The actuating force is exerted against a return force exerted on the rod 46 by a return spring 50 interposed between the moving piston 22 and the control rod 46. Sealing against dust and foreign bodies of the rear end of the moving piston 22 is afforded by a boot 51 which is mounted on the rear end 53 of the casing 12 and through which the control rod 46 passes.

The other, front, free end of the control rod 46 is shaped into a ball 52 which is housed in a complementary housing 54 of a roughly cylindrical plunger 56 which is slidably mounted in the moving piston 22.

At its rear end, the plunger 56 comprises at least one rear annular seat 58 of a three-way valve 60 which can move progressively between a position in which, with the control rod 46 at rest, the front chamber 16 and the rear chamber 18 are in communication, and a position in which, with the control rod 46 actuated, the second pressure "$P_2$" in the rear chamber 18 increases, the valve 60 placing the rear chamber 18 in communication with atmospheric pressure "$P_a$".

As the way in which the three-way valve 60 works is known from the state of the art, this will not be described in any greater detail in this description.

In the known way, the booster 10 comprises a first feeler 62, forming the front end of the plunger 56 and passing through the piston 22. More specifically, the first feeler 62 opens into the front face 26 of the piston 22 facing the reaction disc 44 which is arranged in the cup 36.

Figure 2:
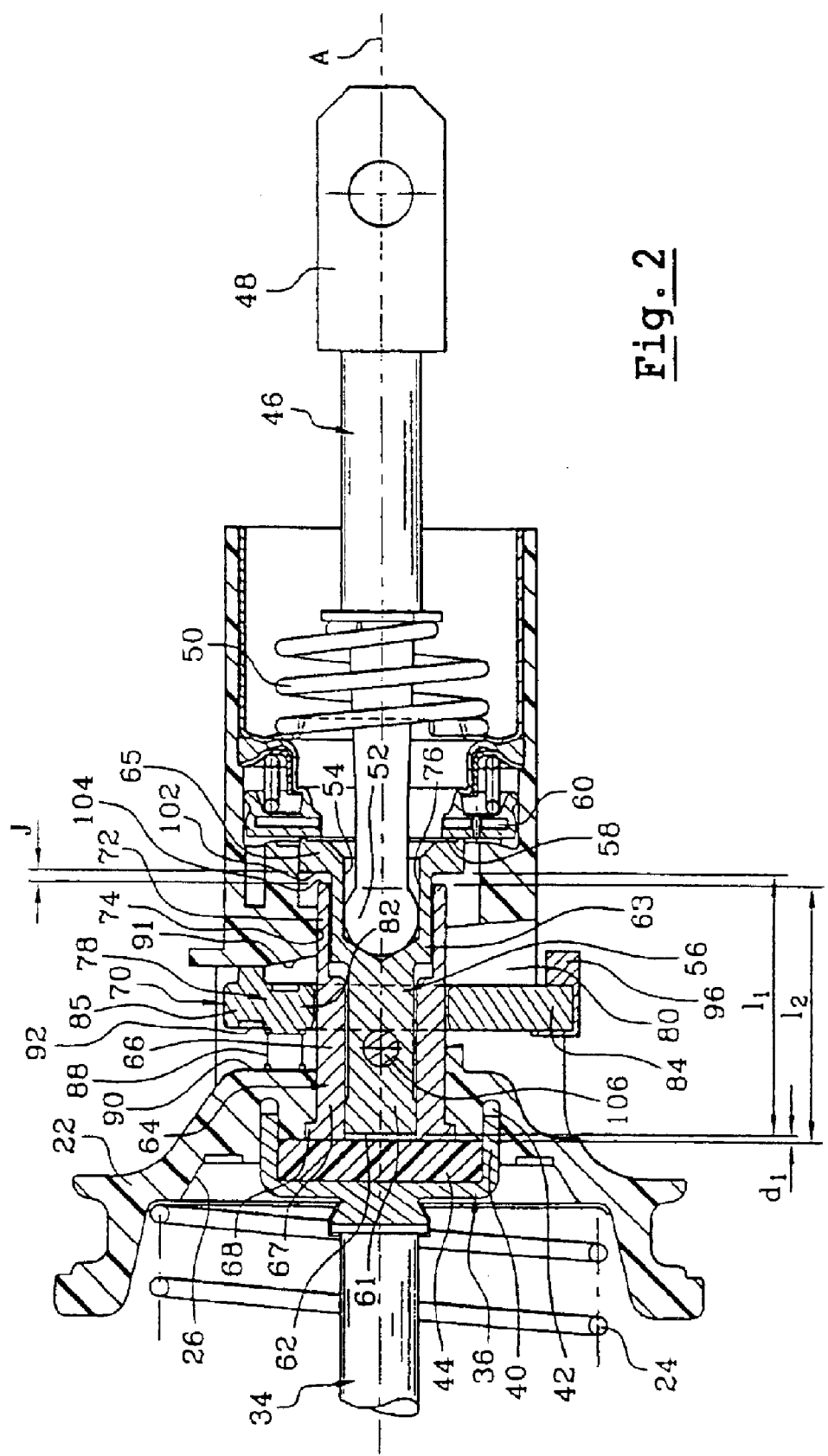
FIG. 2 is a detail view in axial section of the booster of FIG. 1, depicted with the control rod in a rest position.

As illustrated more particularly in FIG. 2, the plunger 56 therefore comprises a front portion 61, the end of which forms the first feeler 62, an intermediate portion 63 of a diameter greater than the front portion, and a rear portion 65 the rear end of which forms the seat 58 of the valve.

Figure 3:
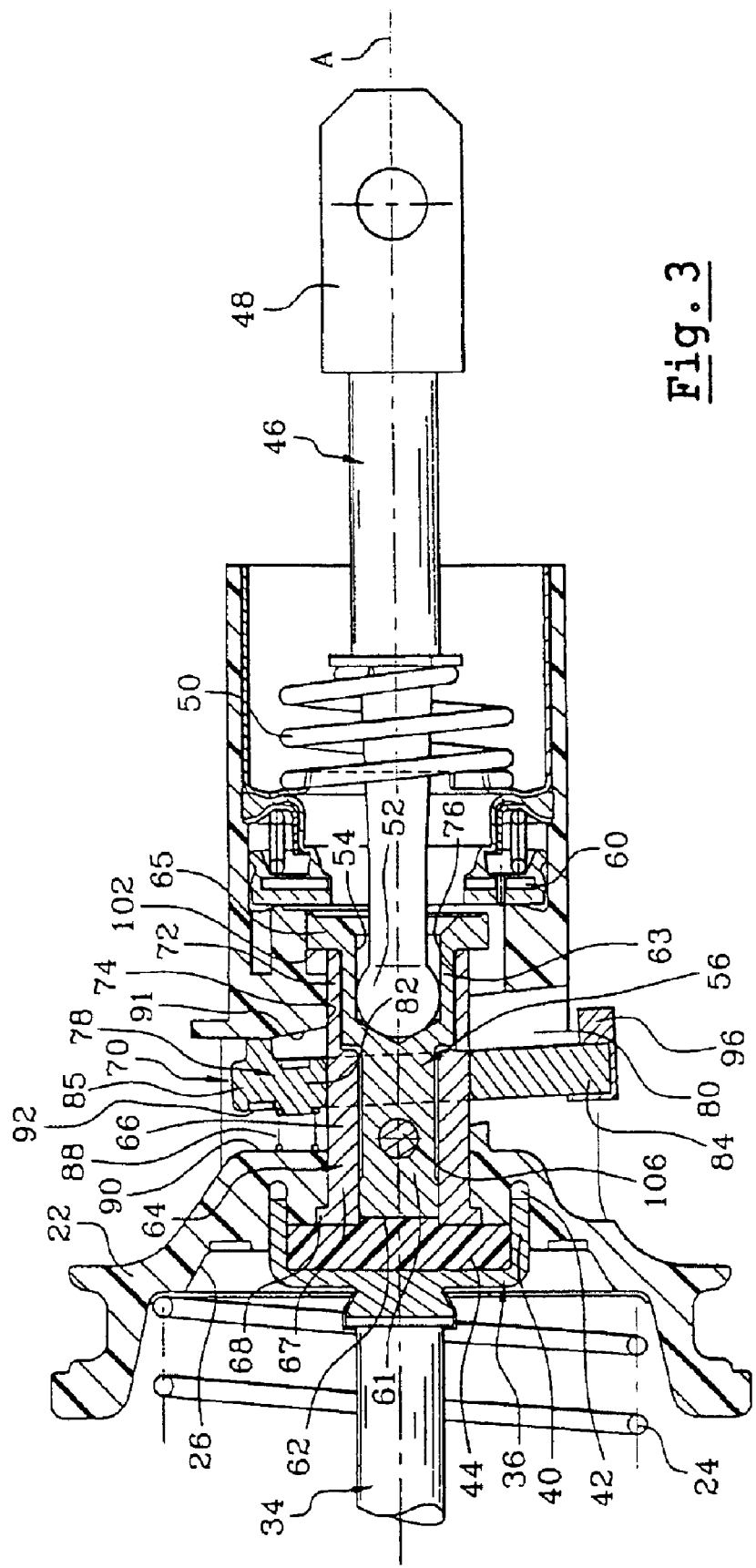
FIG. 3 is a detail view in axial section of the booster of FIG. 1, depicted in a position of slow application of a braking force to the control rod.

When the control rod 46 is in the rest position depicted in FIG. 2, the first feeler 62 is arranged a first determined jump distance "d1" away from the reaction disc 44. When the control rod rod [sic] 46 is actuated at a rate lower than a determined rate, the first feeler 62 is capable, as will be seen later on, of accompanying the piston 22 over the first jump distance "d1" until, with the piston 22 having fully compressed the reaction disc 44 in the cup 36, this disc comes into contact with the first feeler 62 and transmits to the control rod 46 the reaction force of the master cylinder 28 as depicted in FIG. 3.

Figure 4:
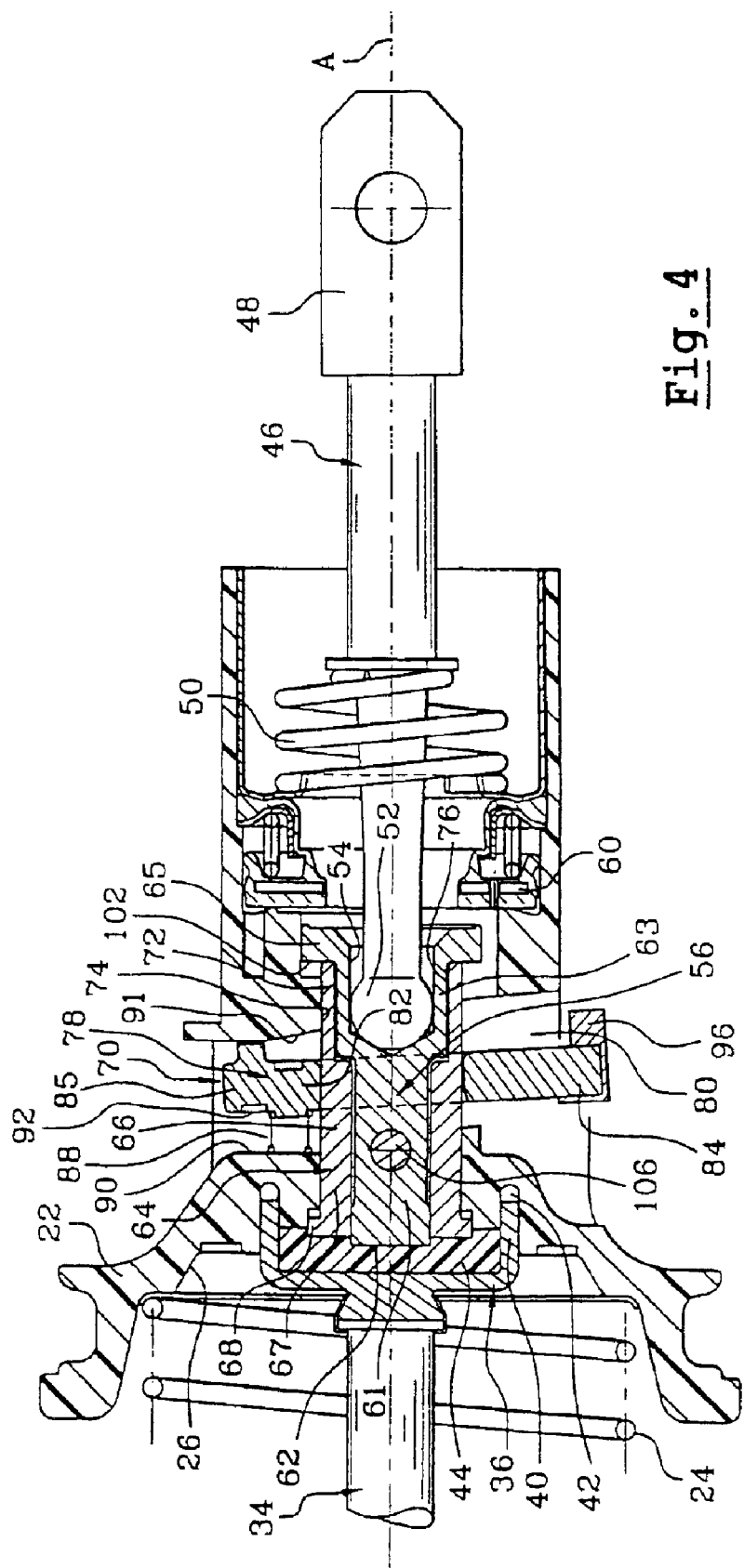
FIG. 4 is a detail view in axial section of the booster of FIG. 1 depicted during high-speed application of a braking force to the-control rod in a first stage of start of actuation of the control rod.
Figure 5:
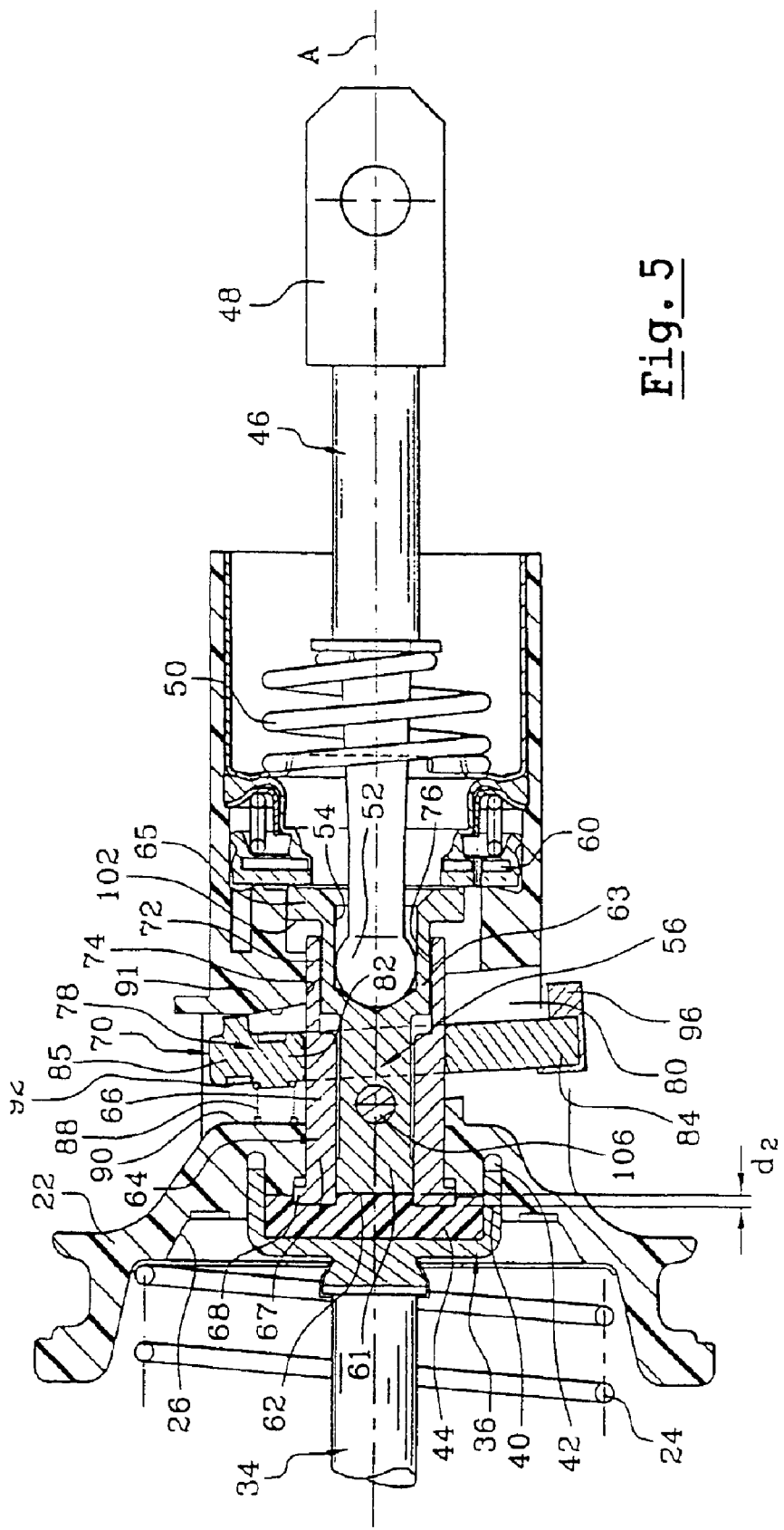
FIG. 5 is a detail view in axial section of the booster of FIG. 1 depicted during high-speed application of a braking force to the control rod in a second, intermediate, stage of actuation of the control rod.

According to the invention, the booster 10 comprises a tubular bushing 64 which is mounted to slide on the plunger 56 which comprises a front portion 66 passing through the piston 22 and one end of which comprises a second feeler 68 which is capable, when the control rod 46 is actuated at a rate higher than the determined rate, of being pushed by the plunger 56 and immobilized with respect to the piston 22 by a one-way engagement device 70 in an axial position that can vary depending on the rate of actuation of the control rod 46, then of being driven by the piston to make the second feeler 68 penetrate the reaction disc 44, as depicted in FIG. 4, so as to allow the first feeler 62 to apply a rapid braking force against an antagonistic reaction force of the master cylinder 28 which is reduced along a second, variable, jump distance "d2" greater than the first jump distance "d1", as depicted in FIG. 5.

According to a first embodiment which is depicted in FIGS. 1 to 5, the second feeler 68 is formed as one with the front end 67 of the bushing 64.

Figure 6:
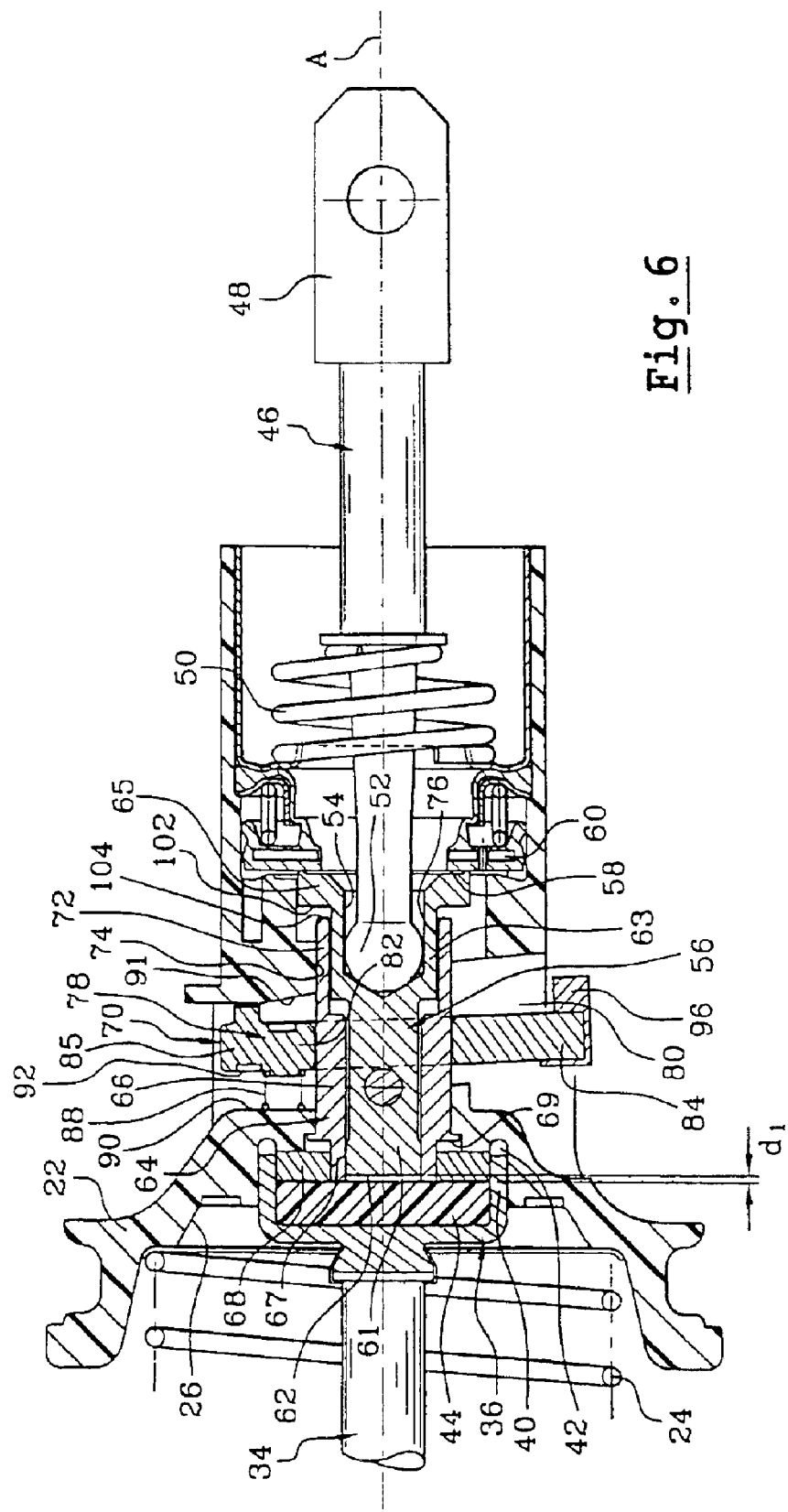
FIG. 6 is a detail view in axial section of a booster in an alternative form, depicted with the control rod in a rest position.

According to a second alternative form of embodiment which is depicted in FIG. 6, the second feeler is produced in the form of an annulus 68 which is slidably mounted on the cylindrical front end 67 of the bushing 64 and which can be pushed into the reaction disc 44 by a shoulder front face 69 of the bushing 64.

In both embodiments of the invention, the bushing 64 is slidably mounted in the piston 22 and is preferably fully coaxial with the plunger 56. For that, the bushing 64 comprises a rear tubular portion 72 which is slidably mounted in a complementary rear bore 74 of the piston 22.

This arrangement is not a limitation on the invention, and the second feeler 68 could be not coaxial with the plunger 56 provided that the front portion 66 of the bushing 64 which carries the second feeler 68 is coaxial with the plunger 56.

Advantageously, the second feeler 68 has an outside diameter greater than that of the rear portion 72 of the bushing and somewhere between that of the reaction disc 44 and that of the first feeler 62.

Furthermore, the rear portion 72 of the bushing 64 comprises a bore 76 which is of a diameter that corresponds to that of the intermediate portion 63 of the plunger 56.

The one-way engagement device 70 comprises a key 78 which is mounted in a recess 80 of the piston 22 passing through the piston 22 at right angles to its axis A, and of which a roughly annular intermediate part 82 surrounds the bushing 64, with clearance. The key 78 comprises a roughly L-shaped lower part 84 which extends radially from the annular part 82, and a roughly radial upper part 85. The lower part 84 is elastically returned against an abutment face 86 of the casing 12 of the booster 10, depicted in FIG. 1, by a return spring 88 of the key 78 which spring is inserted between a front face 90 of the recess 80 of the piston 22 and a front face 92 of the upper part 85.

More particularly, a horizontal branch 96 of the L-shaped lower part 84 is more particularly intended to come into abutment against the abutment face 86 of the casing 12 of the booster 10.

Advantageously, as can be seen in FIG. 1, the abutment face 86 of the casing 12 is, for example, carried by a ring 98 which is housed in the cylindrical casing of the booster 14.

As illustrated in FIG. 4, the key 78 is capable, when the input force is inserted on the control rod 46 at a rate higher than the determined rate, of being driven by the moving piston 22 to rock about an axis which is on the whole transversal so as to collaborate with the periphery of the rear tubular portion 72 of the bushing 64 to immobilize the said bushing 64 with respect to the piston 22 in a variable axial position.

For this, the rear tubular portion 72 of the bushing 64 has a constant diameter so that the roughly annular intermediate part 82 of the key 78 immobilizes the bushing 64 by wedging.

More particularly, with the part 82 hollowed out at a diameter greater than that of the rear portion 72 of the bushing 64, contact which occurs between the annular part 82 of the key 78 and the periphery of the rear tubular portion 72 of the bushing 64 is contact of the roughly point-contact type.

In the position of rest depicted in FIG. 2, a shoulder front face 102, which delimits the intermediate 63 and rear 65 portions of the plunger 56, forms an axial clearance "J" with a shoulder face 104 of the rear portion 72 of the bushing 64.

When a braking force is applied swiftly to the plunger 56, the shoulder front face 102 moves forwards, absorbing the clearance "J" and encounters the shoulder face 104, and this has the effect of pushing the bushing 64 back as depicted in FIG. 4.

This configuration advantageously allows a great many axial positions of immobilization of the bushing to be proposed, each position being dependent upon the axial position to which the bushing 64 is pushed back with respect to the key 78 when the latter rocks.

Thus, during swift application of a braking force to the plunger 56 following actuation of the control rod 46, the piston 22 first of all advances less quickly than the plunger 46 because of the delay in balancing the pressures in the front 14 and rear 16 chambers of the booster. As a result, the swifter the application of the braking force, the more the bushing 64 is pushed back by the plunger 46 before, with the piston 22 advancing in its turn and the key 78 leaving its resting place on the abutment face 98 of the casing, the key 78 rocks.

In this configuration, the booster 10 can operate in different configurations which have been depicted in FIGS. 2 to 5.

When the control rod 46 is in the rest position depicted in FIG. 2, the horizontal branch 96 of the lower part 84 of the key 78 rests against the abutment face 86 of the casing 12 of the booster 10 and the upper part 85 of the key 78 rests against the rear face 91 of the recess 80.

A transverse pin 106 which passes through an aperture (not depicted) in the bushing 64 and the plunger 56 is, when the rod 46 is in the rest position, resting against a front face of the annular intermediate part 82 of the key 78 to determine the rest position of the plunger 56, the first feeler 62 of which forms, with the reaction disc 44, the first jump distance "d1". The shoulder front face 102 of the plunger 56 forms the clearance "J" with the shoulder face 104 of the rear portion 72 of the bushing 64.

Thus, as illustrated by FIGS. 3 to 5, when an input force is applied forwards along extreme travel of the control rod 46, the lower part 84 of the key 78 leaves its point of rest against the abutment face 86. As a result, the key 78 rocks about an axis which on the whole is transversal, and in the anticlockwise direction, to collaborate with the periphery of the bushing 64.

If the input force is applied relatively slowly, that is to say in the case of normal braking depicted in FIG. 3, the pressures "$P_1$" and "$P_2$" in the front and rear chambers of the booster 10 balance each other at roughly the same speed as the speed at which the plunger 56 advances under the effect of actuation of the control rod 46. As a result, the plunger 46 and the piston 22 advance at roughly the same rate. As soon as the piston 22 advances, the lower part 84 of the key 78 leaves its resting place against the abutment face 86 and this causes the key 78 to rock, the intermediate part 82 of which key drops on to the periphery of the front portion 66 of the bushing 64, immobilizing it. The second feeler 68, immobilized, accompanies the piston 22 without penetrating the reaction disc 44. The piston 22 compresses the reaction disc 44 and the latter deforms to fill the cavity formed in the bushing 64 by the jump distance "d1". The distance "d1" is covered when the reaction disc 44 can no longer compress in contact with the first feeler 62.

By contrast, if the input force is applied at a rate higher than a determined rate as depicted in FIG. 4, that is to say in the case of emergency braking, the pressures "$P_1$" and "$P_2$" in the front and rear chambers of the booster 10 balance at a rate which is lower than the rate at which the plunger 56 advances under the effect of actuation of the control rod 46.

As a result, according to a first stage of start of actuation of the control rod 46, which stage is depicted in FIG. 4, the plunger 56, which slides forward with respect to the piston 22, first of all pushes back the bushing 64 via its shoulder front face 102 to an axial position that can vary and the two feelers 62 and 64 advance simultaneously. The piston 22 starts to move in its turn and the key 78 drops down on to the periphery of the rear portion 72 of the bushing 64, locking it in this variable position which depends on the rate at which the plunger 56 was actuated before the key 78 dropped on to the periphery of the bushing 64.

It should be pointed out that, from this moment on, the variable axial position of the second feeler 68 with respect to the piston 22 is determined in a stable manner by the wedging of the key 78 on the bushing 64.

Next, in a second, intermediate, stage of actuation of the control rod, which stage is depicted in FIG. 5, the piston 22 moves under the effect of the increase in pressure in the rear chamber 18 of the booster. As a result, the second feeler 68, moved by the bushing 64 locked with respect to the piston 22, penetrates deeper into the reaction disc 44 while the first feeler 62 remains more or less immobile. As a result, the second feeler 68 locally compresses the reaction disc and this has the effect of locally decompressing the reaction disc 44 at the level of the first feeler 62.

As the jump distance is characterized by the distance which separates the rest position of the first feeler 62 and the position of the feeler 62 in which it compresses the reaction disc 44, the feeler 62 can therefore still cover a variable second jump distance "d2" determined initially by the axial position at which the second feeler 68 is immobilized with respect to the piston 22, which distance is greater than the previously mentioned jump distance "d1".

It will be understood that the position of the second feeler 68 and, in particular, its penetration into the reaction disc 44, depends on the distance by which the bushing 64 is pushed back before the key 78 rocks, and therefore on the rate at which the braking force is applied to the control rod 46.

According to a final third stage of actuation of the control rod 46, the first feeler 62 can therefore locally recompress the reaction disc 44 along the distance "d2" until the said disc 44 can no longer be compressed. At the end of this third stage, the booster is therefore in a configuration similar to the one depicted in FIG. 4, except that, the piston 22 has advanced in the casing 12 of the booster 10.

In this instance, this second distance "d2" is appreciably greater than the distance separating the first feeler 62 from the second feeler 68, but it would be possible for the first feeler 62 to compress the reaction disc 44 when it came into line with the second feeler 68, this all depending on the mechanical properties of the elastomer of which the reaction disc 44 is made.

Whatever the case may be, the distance "d2" that can vary according to the travel with which the bushing 64 was pushed back initially will be covered by the first feeler 62 in the presence of an antagonistic reaction force from the master cylinder which is reduced and variable because the reaction disc 44 will be kept more or less compressed at the second feeler 68 which is locked by the key 78.

Advantageously, the swifter the application of the braking force, the more the second feeler 68 will have been pushed back with respect to the piston 22, and the deeper it will penetrate the reaction disc 44 when moved by the moving piston 22.

This will have the effect of locally compressing the reaction disc 44 still more and as a result, the reduced force to be supplied by the driver in order for the first feeler 62 to overcome the antagonistic reaction force of the master cylinder 28 will be all the smaller.

It will be understood that, in the preferred embodiment of the invention, a distance "l2" separating the shoulder 104 of the bushing 64 from the second feeler 68 needs to be kept smaller than a distance "l1" separating the shoulder 102 of the plunger 56 from the first feeler 62, this being so that, at the end of the travel of the actuating rod 46, that is to say once the jump distance "d2" has been covered, the feeler 62 will actually penetrate the reaction disc 44 to transmit the reaction force from the master cylinder 28 to the driver of the vehicle.

It will also be understood that complete release of the control rod 46, which causes the piston 22 to move back, causes the lower part 84 of the key to return to rest against the abutment face 86 of the ring 98 and therefore causes the bushing 64 to be unlocked in a configuration similar to that of FIG. 2.

The booster 10 is therefore characterized by two differentiated jump distances, namely a first jump distance "d1" which is fixed and reserved for application of a braking force at a slow rate, and a second jump distance "d2" which is variable, reserved for the application of a braking force at a fast rate.

The invention therefore advantageously allows modulation of the intensity of the braking force to be supplied in the context of swift application and allows a braking force to be maintained after this swift application.

What is claimed is:

1. A pneumatic brake booster (10) for actuating a brake master cylinder (28) of a motor vehicle, having a rigid casing (12) in which a transverse partition (14) sealingly moves while delimiting a front chamber (16) subjected to a first, engine depression, pressure ($P_1$) and a rear chamber (18) subjected to a second pressure ($P_2$) that varies between the engine depression and atmospheric pressure ($P_a$), a moving piston (22) that is secured to the moving partition (14) with a front face (26) that acts on a rod (34) for actuation of the master cylinder, a rod (46) that moves in the piston (22) to selectively control of the booster (10) as a function of an axial input force exerted forwards against a return force exerted on the rod (38) by a return spring (50), a plunger (56) which is arranged in front of the control rod (46) in the piston (22) having rear end that comprises at least one annular rear seat (58) for a three-way valve (60) progressively moves between a position in which, with the control rod (56) at rest, the front chamber (16) and the rear chamber (18) are in communication, and a position in which, with the control rod (56) actuated, the second pressure ($P_2$) in the rear chamber (18) increases as the valve (60) places the rear chamber (18) in communication with atmospheric pressure ($P_a$), and a first feeler (62) formed on a front end of the plunger (56) that passes through the piston (22) when the control rod (46) is in the rest position and is arranged a first determined jump distance (d1) away from a reaction disc (44) inserted between the rod (34) for actuation of the master cylinder (28) and the front face (26) of the moving piston (22), and when the control rod (46) is actuated at a rate lower than a determined rate by the plunger (56) to moves through the first jump distance (d1) and then penetrate the reaction disc (44) in such a way as to transmit to the plunger (56) and to the control rod (46) the reaction force of the master cylinder (28), characterized in that said three-way valve (60) includes a tubular bushing (64) which is slidably mounted on the plunger (56) and has a front portion (66) that passes through the piston (22) with an end thereof that comprises a second feeler (68) and a rear tubular portion (72) that is slidably mounted in a complementary rear bore (74) of the piston (22), said second feeler (68) including in annulus that is slidably mounted an the cylindrical front end (67) of the bushing (64), said second feeler (68) when the control rod (46) is actuated at a rate higher than a determined rate being pushed into the reaction disc by a shoulder front face (69) of the bushing (64) by the plunger (56) and immobilized with respect to the piston (22) by a one-way engagement device (70) in an axial position that can vary depending on the rate at which the control rod is actuated and then is driven by the piston to cause the second feeler (68) to penetrate the reaction disc (44) to allow the first feeler (62) to apply a rapid braking force against an antagonistic reaction force of the master cylinder (28) which is reduced along a second, variable, jump distance (d2) greater than the first jump distance (d1).

2. Booster (10) according to claim 1, characterized in that the one-way engagement device (70) comprises a key (78) is mounted in a recess (80) of the piston (22) and passes through the piston (22) at right angles to its axis (A) and having a roughly annular part (82) that surrounds the bushing (64) with clearance and when the input force exerted on the control rod (46) is at a rate higher than the determined rate, is driven by the moving piston (22) to rock about an axis that is transversal to collaborate with the periphery of the rear tubular portion (72) of the bushing (64) to immobilize the bushing (64) in the variable axial position.

3. Booster (10) according to the preceding claim 1, characterized in that the rear tubular portion (72) of the bushing (64) has a constant diameter so that the roughly annular part (82) of the key (78) immobilizes the bushing (64) by wedging.

4. Booster (10) according to claim 2, characterized in that the key (78) comprises a roughly L-shaped lower part (84) which extends radially from its annular part (82) and is returned elastically against an abutment face (86) of the casing (12) of the booster (10) by a return spring (88) that is inserted between a front face (90) of the recess (80) of the piston (22) and a front face (92) of an upper part (85) of the key (78).

5. Booster (10) according to claim 1, characterized in that the second feeler (68) comprises an annular front face which is coaxial with the bushing (64) and has an outside diameter greater than that of the rear portion (72) of the bushing (64).

6. Booster (10) according to the preceding claim, characterized in that the reaction disc (44) is housed in a cup (36) coaxial with the piston (22), which is secured to the rear end (38) of the actuating rod (34) and a rear tubular part (40) of which is slidably mounted in a coaxial annular groove (42) of the front face (26) of the piston (22).

7. Booster (10) according to the preceding claim, characterized in that the second feeler (38) is formed as one with the front end (67) of the bushing (64).

8. A pneumatic brake booster (10) for actuating a brake master cylinder (28) of a motor vehicle, having a rigid casing (12) in which a transverse partition (14) sealingly moves while delimiting a front chamber (16) subjected to a first, engine depression, pressure ($P_1$) and a rear chamber (18) subjected to a second pressure ($P_2$) that varies between the engine depression and atmospheric pressure ($P_a$), a moving piston (22) that is secured to the moving partition (14) with a front face (26) that acts on a rod (34) for actuation of the master cylinder, a rod (46) that moves in the piston (22) to selectively control of the booster (10) as a function of an axial input force exerted forwards against a return force exerted on the rod (38) by a return spring (50), a plunger (56) which is arranged in front of the control rod (46) in the piston (22) having rear end that comprises at least one annular rear seat (58) for a three-way valve (60) progressively moves between a position in which, with the control rod (56) at rest, the front chamber (16) and the rear chamber (18) are in communication, and a position in which, with the control rod (56) actuated, the second pressure ($P_2$) in the rear chamber (18) increases as the valve (60) places the rear chamber (18) in communication with atmospheric pressure ($P_a$) and a first feeler (62) formed on a front end of the plunger (56) that passes through the piston (22) when the control rod (46) is in the rest position and is arranged a first determined jump distance (d1) away from a reaction disc (44) inserted between the rod (34) for actuation of the master cylinder (28) and the front face (26) of the moving piston (22), and when the control rod (46) is actuated at a rate lower than a determined rate by the plunger (56) to moves through the first jump distance (d1) and then penetrate the reaction disc (44) in such a way as to transmit to the plunger (56) and to the control rod (46) the reaction force of the master cylinder (28), characterized in that said three-way valve (60) includes a tubular bushing (64) which is slidably mounted on the plunger (56) and has a front portion (66) that passes through the piston (22) with an end thereof that comprises a second feeler (68) and a rear tubular portion (72) that is slidably mounted in a complementary rear bore (74) of the piston (22), said second feeler (68) including an annular front face that is coaxial with the bushing (64) and has an outside diameter greater than that of the rear portion (72) of the bushing (64), said second feeler (68) when the control rod (46) is actuated at a rate higher than a determined rate being pushed into the reaction disc by a shoulder front face (69) of the bushing (64) by the plunger (56) and immobilized with respect to the piston (22) by a one-way engagement device (70) in an axial position that can vary depending on the rate at which the control rod is actuated and then is driven by the piston to cause the second feeler (68) to penetrate the reaction disc (44) to allow the first feeler (62) to apply a rapid braking force against an antagonistic reaction force of the master cylinder (28) which is reduced along a second, variable, jump distance (d2) greater than the first jump distance (d1).

* * * * *